United States Patent
DiCicco et al.

(10) Patent No.: US 11,519,826 B2
(45) Date of Patent: *Dec. 6, 2022

(54) ALIGNMENT TOOL FOR DRY-DEPOSITION AND KIT FOR ASSEMBLING APPARATUS FOR VERIFYING EXPLOSIVE TRACE DETECTOR RESPONSES

(71) Applicant: The Government of the United States of America, as represented by the Secretary of Homeland Security, Washington, DC (US)

(72) Inventors: Joseph DiCicco, Cape May Court House, NJ (US); Paul Flanigan, Northfield, NJ (US); Joshua Stroker, Somers Point, NJ (US); James Deline, Egg Harbor City, NJ (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/715,584

(22) Filed: Apr. 7, 2022

(65) Prior Publication Data

US 2022/0228953 A1 Jul. 21, 2022

Related U.S. Application Data

(63) Continuation of application No. 17/370,746, filed on Jul. 8, 2021, now Pat. No. 11,333,581.

(Continued)

(51) Int. Cl.
*G01N 1/02* (2006.01)

(52) U.S. Cl.
CPC ......... *G01N 1/02* (2013.01); *G01N 2001/022* (2013.01); *G01N 2001/028* (2013.01)

(58) Field of Classification Search
CPC ............... G01N 1/02; G01N 2001/022; G01N 2001/028; G01R 1/00; G01R 1/02

(Continued)

(56) References Cited

U.S. PATENT DOCUMENTS

| | | | | |
|---|---|---|---|---|
| 7,047,829 B2* | 5/2006 | Napoli | ................. | G01N 27/622 73/864.31 |
| 7,833,481 B2* | 11/2010 | Eltomi | ............... | G01N 33/0057 73/23.3 |
| 2019/0025274 A1* | 1/2019 | Deline | ................. | G01N 33/227 |

FOREIGN PATENT DOCUMENTS

WO WO-2011106784 A1 * 9/2011 ......... A61B 10/0045

* cited by examiner

*Primary Examiner* — Marrit Eyassu
(74) *Attorney, Agent, or Firm* — Lavanya Ratnam; Kelly G. Hyndman; Robert W. Busby

(57) ABSTRACT

A kit-of-parts for assembling an apparatus for verifying Explosive Trace Detector responses includes an alignment tool and a dispenser. The alignment tool has a body with a top cavity open on a top side and configured to receive the dispenser housing or a sampling medium head of a sampling medium. The sampling medium head has a sample collection area. The body has a bottom cavity to receive a hammer arm. The body has one or more sampling media cavities disposed between the top cavity and the bottom cavity, each configured to receive another sampling medium having a respective sample collection area. The top cavity and sampling media cavities are in communication with each other via a common slot. The top cavity and sampling media cavities are configured to receive different sampling media and to align the dispenser housing with the sample collection area of each of the different sampling media.

26 Claims, 9 Drawing Sheets

Related U.S. Application Data

Figure 1:
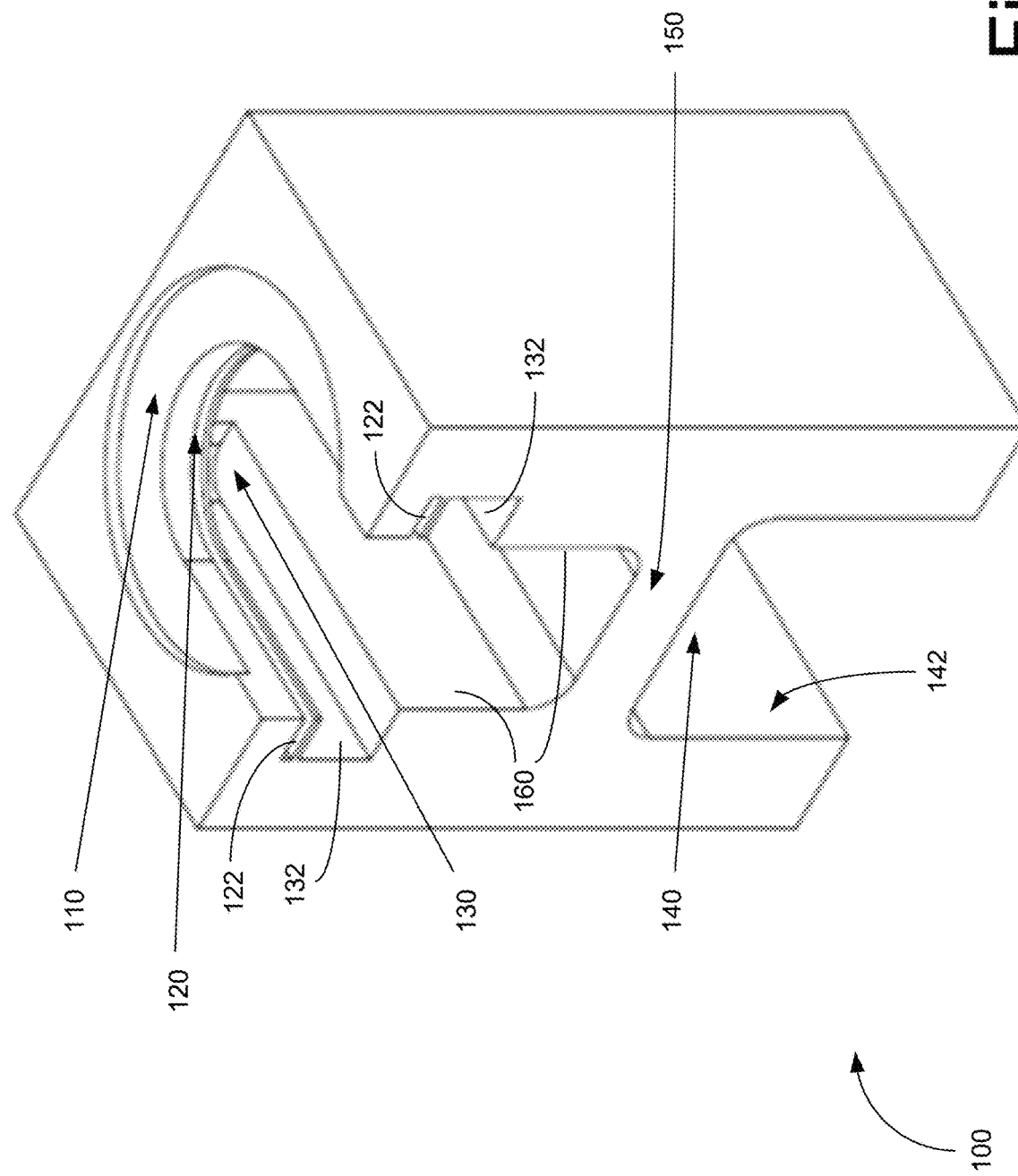

(60) Provisional application No. 63/050,374, filed on Jul. 10, 2020.

(58) Field of Classification Search
USPC .......................................................... 73/864
See application file for complete search history.

ALIGNMENT TOOL FOR DRY-DEPOSITION AND KIT FOR ASSEMBLING APPARATUS FOR VERIFYING EXPLOSIVE TRACE DETECTOR RESPONSES

CROSS-REFERENCE TO RELATED APPLICATIONS

This application is a continuation of U.S. patent application Ser. No. 17/370,746, filed on Jul. 8, 2021, entitled ALIGNMENT TOOL FOR DRY-DEPOSITION OF MATERIAL, which is a nonprovisional of and claims the benefit of priority from U.S. Provisional Patent Application No. 63/050,374, filed on Jul. 10, 2020, entitled ALIGNMENT TOOL FOR DRY-DEPOSITION OF THREAT MATERIAL ONTO EXPLOSIVE TRACE DETECTOR VENDOR MEDIA, the entire disclosures of which are incorporated herein by reference.

STATEMENT OF GOVERNMENT INTEREST

This invention was made with support from the United States Department of Homeland Security (DHS) under contract 70RSAT18FC0000016 and by an employee of DHS in the performance of his official duties. The U.S. Government has certain rights in this invention.

FIELD

The discussion below relates generally to alignment devices and, more particularly, to an alignment tool for aligning different sampling media in order to deposit material such as a threat material onto target spots of sampling media.

BACKGROUND

Trace analyte detection has numerous applications. For example, trace analyte detection may be used for screening individuals or baggage at transportation centers, or screening pieces of mail. Trace analyte detection may be used to provide security at facilities requiring advanced security applications. Trace analyte detection has numerous other applications, e.g., military applications, forensics applications, narcotics detection and identification, cleaning validation, quality control, and raw material identification. Generally speaking, trace analyte detection may be used for the detection of small amounts of analytes, including detection at nanogram to picogram levels. Trace analyte detection can be particularly useful for security applications such as screening individuals or items for trace components in explosive materials, narcotics, or biological contaminants where small amounts of these components are deposited on an individual, the surface of a package, a piece of mail, an animal, a table surface, a bag, or the like.

Trace analysis can be important in the pharmaceutical industry. For example, from time to time equipment must be checked for contamination to ensure pharmaceutical ingredients do not come in to contact with unclean equipment surfaces. Equipment surfaces can be sampled and analyzed for trace contaminants in accordance with manufacturing specifications and safety standards.

A variety of different techniques can be used for trace analyte detection. Ion mobility spectrometry (IMS), mass spectrometry, gas chromatography, liquid chromatography, and high performance liquid chromatography (HPLC) are examples of trace analyte detection techniques.

IMS, as an example technique, is a useful technique for rapid, accurate detection and identification of trace analytes such as narcotics, explosives, and chemical warfare agents. IMS detects and identifies known analytes by detecting a signal which is unique for each analyte. IMS measures the drift time of ions through a fluid, such as clean, dry ambient air at atmospheric pressure. Generally, to perform an analysis a sample is collected and transferred to the sampling medium. The sampling medium containing the analyte is inserted into the inlet of the spectrometer. The sample is heated to transform an analyte from solid, liquid or vapor preconcentrated on the media into a gaseous state. Analyte molecules are ionized in the reaction region of the ion mobility spectrometer. Ions are then spatially separated in the IMS drift region depending on their ion mobility, an intrinsic property of an ion. An induced current at a collector generates a signature for an ion as a function of the time required for that ion to reach the collector. This signature can be used to identify a specific analyte.

It is important to properly align the sample collection area of the sampling substrate material or swab within an analyzer. This is to ensure the portion of the substrate material containing the sample is analyzed by the analytical device. For example, for the IMS technique the collected sample must be properly aligned on the sample desorber so the collected sample is desorbed and analyzed by the IMS. When the sample area of the substrate is not properly aligned within the analyzer, the collected sample may not be completely desorbed. Therefore, the test results of the sample can be affected by how the sample area of the substrate is aligned within the analyzer. While the discussion below focuses on the IMS technique, other trace detection techniques have analogous requirements for accurate analysis.

A variety of sample collection devices (media) of different configurations are used with different IMSs and other detection devices. Typically, sample collection devices (substrates) have a target sample area for collecting or holding a sample. It is important to align the sample in the sample area of the sample collection device (also referred to herein as "sampling medium" or "vendor medium"). The detection system is more sensitive to an analyte aligned in the target sample area. When an analyte is properly aligned in the target sample area it is more readily desorbed when heated, for techniques using heat, as an example. Accordingly, accuracy is improved.

SUMMARY

Embodiments of the present invention are directed to apparatuses and methods for properly aligning sample collection devices in analytical detection devices using an alignment tool. The alignment tool is used to accurately deposit a sample onto a target sample area of the sample collection device. In this way, depending on the trace detection technique and detection device, the sample collection device can be aligned for sample collection, via the alignment tool, which is configured for aligning a variety of sample collection devices of different configurations. One particularly useful application is in quality control. The alignment tool can consistently deliver threat material from propellant-based solutions via an actuator dispenser onto the correct spot of different sampling media for various Explosive Trace Detector (ETD) systems. Each ETD vendor has different sampling media envelopes with different target deposition spots and the alignment tool allows a user to deposit (e.g., dry-deposit) threat material onto the target spot of different vendor media using the same tool.

In specific embodiments, the alignment tool is used with a metered dose dispenser (MDD) vial or canister, and an MDD actuator or dispenser or actuator dispenser. The user is able to properly align the actuator dispenser and deposit material onto the correct locations of the ETD vendor media. The alignment tool can be used to perform quality control of MDD vials in the ETD test kits and verify ETD responses.

In an embodiment, an alignment tool comprises a body having: a top cavity which is open on a top side and configured to receive a dispenser housing or a sampling medium head of a sampling medium on which to place the dispenser housing, the sampling medium head having a sample collection area; a bottom cavity configured to receive a hammer arm; one or more sampling media cavities disposed between the top cavity and the bottom cavity, each configured to receive another sampling medium having a respective sample collection area; and a barrier disposed between the bottom cavity and other cavities including the top cavity and the one or more sampling media cavities. The top cavity and the one or more sampling media cavities are in communication with each other via a common slot extending from the top cavity to the barrier. The top cavity and the one or more sampling media cavities are configured to receive a plurality of different sampling media and to align the dispenser housing with the sample collection area of each of the different sampling media to be received in the top cavity or the one or more sampling media cavities.

In an embodiment, an alignment tool comprises a body having: a dispenser side cavity which is open on a dispenser side and configured to receive a dispenser housing; a support side cavity configured to receive a hammer arm; a plurality of sampling media cavities disposed between the dispenser side cavity and the support side cavity, each configured to receive a sampling medium having a respective sample collection area; and a barrier disposed between the support side cavity and other cavities including the dispenser side cavity and the sampling media cavities. The dispenser side cavity and the sampling media cavities are in communication with each other via a common slot extending from the dispenser side cavity to the barrier. The dispenser side cavity and the sampling media cavities are configured to receive a plurality of different sampling media and to align the dispenser housing with the respective sample collection area of each of the different sampling media to be received in the dispenser side cavity or the sampling media cavities.

Another aspect is directed to a method of aligning a dispenser housing with sample collection areas of a plurality of different sampling media using an alignment tool, which includes a body having a dispenser side cavity which is open on a dispenser side, a support side cavity, a plurality of sampling media cavities disposed between the dispenser side cavity and the support side cavity, and a barrier disposed between the support side cavity and other cavities including the dispenser side cavity and the plurality of sampling media cavities. The dispenser side cavity and the sampling media cavities are in communication with each other via a common slot extending from the dispenser side cavity to the barrier. In an embodiment, the method comprises: placing a dispenser housing on the dispenser side cavity; placing a sampling medium in one of (i) a sampling media cavity of the sampling media cavities, the dispenser side cavity and the sampling media cavity aligning the dispenser housing with the sample collection area of the sampling medium placed in the sampling media cavity, or (ii) the dispenser side cavity between the body and the dispenser housing, the sampling medium configured to align the dispenser housing with the sample collection area of the sampling medium; and if the sampling medium being placed includes a hammer arm, placing the hammer arm in the support side cavity. The dispenser side cavity and the sampling media cavities are configured to receive the plurality of different sampling media and to align automatically the dispenser housing with the sample collection area of each of the different sampling media to be received in the sampling media cavities.

The features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings disclose embodiments.

FIG. 1 is a perspective view showing an example of an alignment tool.

FIG. 2 shows cross-sections of the alignment tool of FIG. 1, illustrating (A) a first cavity for aligning an actuator dispenser, (B) a second cavity for aligning a hand swab, and (C) a third cavity for aligning a sampling wand or insert.

FIG. 3 shows a CAD (Computer Aided Design) image of the alignment tool of FIG. 1 illustrating four cavities.

FIG. 4 shows an example of the actuator dispenser for use with the alignment tool of FIG. 1, which includes (A) a cross-sectional view of the MDD actuator dispenser having a dispenser housing, (B) a cross-sectional view of the MDD actuator dispenser and a threat MDD vial for engaging the actuator dispenser, and (C) a perspective view of the MDD actuator dispenser and vial.

FIG. 5 shows an example illustrating the use of the alignment tool with the Smiths 500DT sampling wand, including an exploded view of the assembly including (A) an alignment tool, MDD vial, representative actuator dispenser, the Smiths 500DT sampling wand, and the Smiths sampling wand hammer arm, (B) after loading a swab into the ETD sampling wand and lining it up with the alignment tool, pushing the sampling wand into the larger slot of the third cavity of the tool with the hammer arm underneath, and (C) inserting the sampling wand fully and then actuating the MDD vial.

FIG. 6 shows an example illustrating preparation of highly volatile material samples using the Smiths 500DT sampling wand.

FIG. 7 shows an example illustrating the use of the alignment tool for Smiths 500DT hand swabs, including an exploded view of the assembly including the alignment tool, MDD vial, and Smiths 500DT hand swab.

FIG. 8 shows an example illustrating the use of the alignment tool for L3 QS-B220 sampling swabs, including an exploded view of the assembly including the alignment tool, insert, MDD vial, actuator dispenser, and L3 QS-B220 sampling media.

DETAILED DESCRIPTION

A number of examples or embodiments of the present invention are described and disclosed herein. The present invention provides many applicable inventive concepts that have been disclosed and can be embodied in a variety of ways. Rather, as will be appreciated by one of skill in the art, the teachings and disclosures herein can be combined or rearranged with other portions of this disclosure along with the knowledge of one of ordinary skill in the art.

Alignment Tool Physical Structure

FIG. 1 is a perspective view showing an example of an alignment tool 100. The body of the alignment tool may be a rectangular block but can have other configurations depending on the trace analysis detector or method of analysis. In this embodiment the tool 100 has a first cavity 110 (top cavity or dispenser side cavity) on top for aligning an MDD actuator dispenser, a second cavity 120 (hand swab cavity) for aligning a hand swab, a third cavity 130 (sampling wand cavity) for aligning a sampling wand or an insert for another media, and a fourth cavity 140 (bottom cavity or hammer cavity or support side cavity) for placing a hammer arm of the sampling wand. The body of the alignment tool 100 is supported on the support side which may be the bottom and is coupled to the actuator dispenser on the dispenser side which may be the top of the body.

Figure 2:
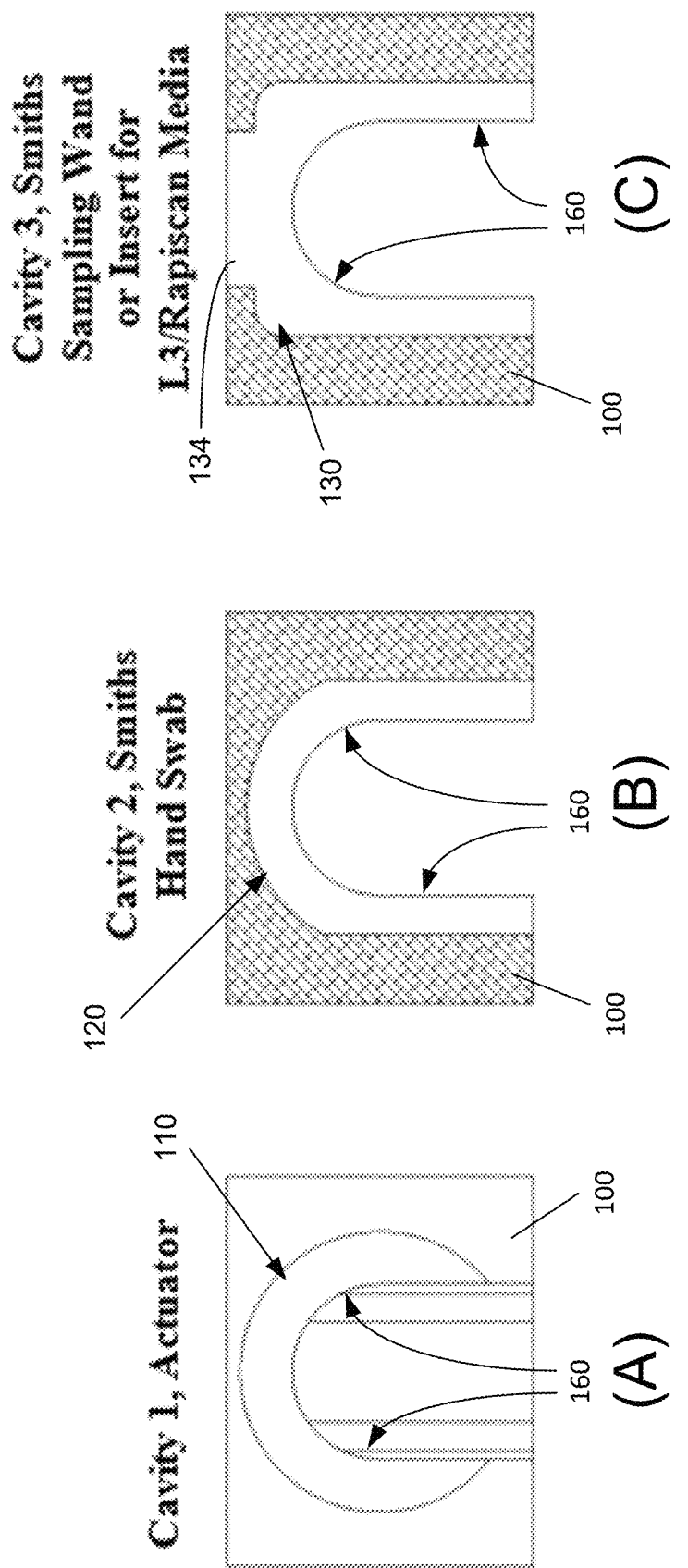

In some embodiments, the alignment tool 100 may be configured to receive a Smiths hand swab into the second cavity 120 and a Smiths sampling wand or an insert for L3 Rapiscan media into the third cavity 130. FIG. 2 shows cross-sections of the alignment tool 100, illustrating (A) the first cavity 110 for aligning an actuator dispenser, (B) the second cavity 120 for aligning a hand swab, and (C) the third cavity 130 for aligning a sampling wand or insert.

In some embodiments, the alignment tool 100 has guide channels 122 for guiding the hand swab into the second cavity 120, guide channels 132 for guiding the sampling wand or insert into the third cavity 130, and a cavity cut-out 142 (or cavity opening) for receiving the hammer arm into the fourth cavity 140. The guide channels 122, 132 and the cavity cut-out 142 are oriented horizontally in one direction toward a side of the block (open side). The first to third cavities (110, 120, 130) are aligned vertically and open to each other vertically, but are not open to the fourth cavity 140 which is used to place the hammer arm underneath a horizontal barrier 150 separating the fourth cavity 140 from the first to third cavities (110, 120, 130). As such, the horizontal barrier 150 prevents or significantly reduces any potential contamination of the propellant breakthrough from the vendor media onto the hammer arm. In addition, for ease of manufacturing and operation, the first to third cavities (110, 120, 130) may have a common vertical cut-out or common slot 160, as seen in FIGS. 1 and 2.

Figure 3:
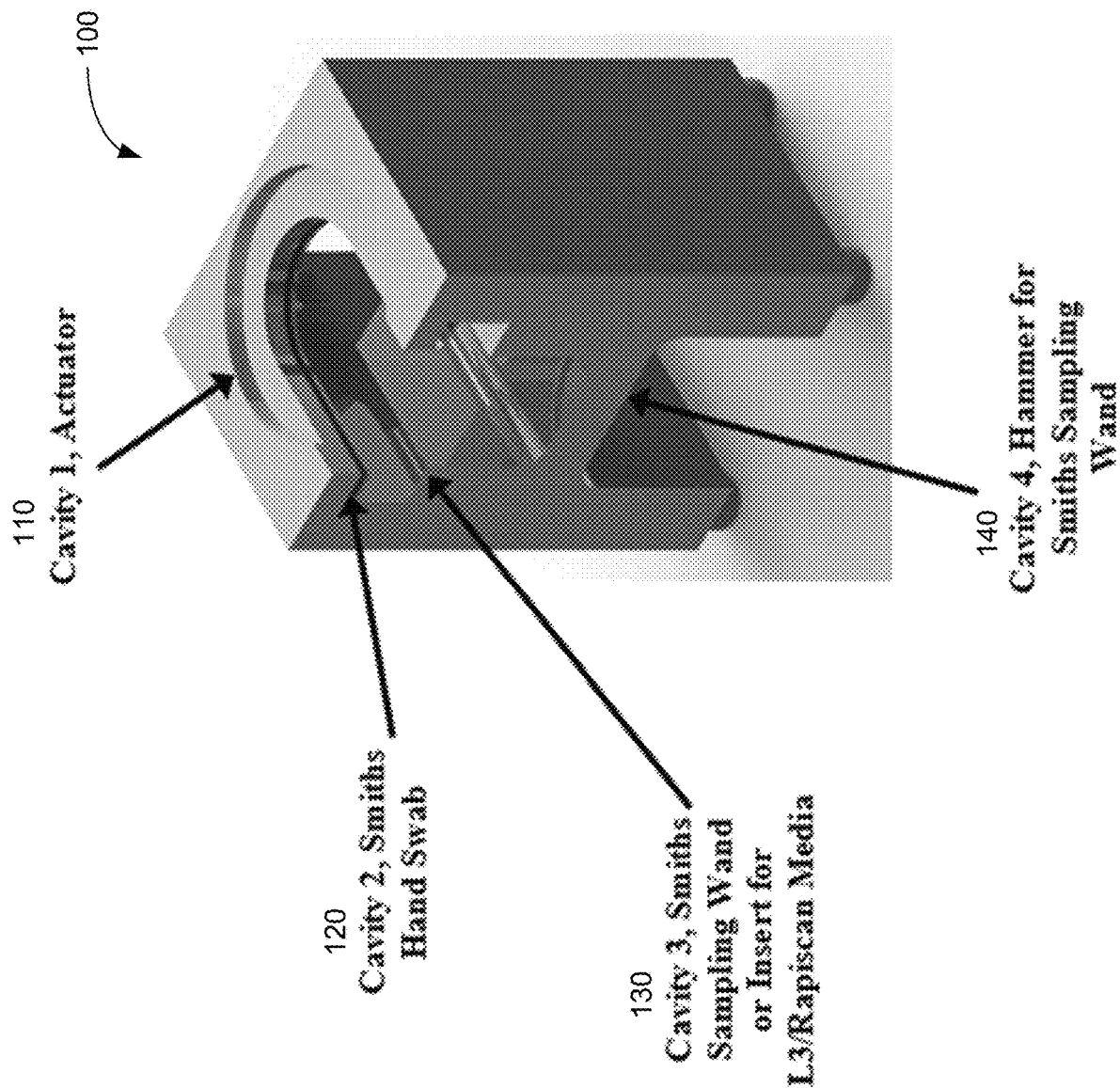

The alignment tool 100 may be a block having three different sections (first cavity 110, second cavity 120, third cavity 130) that fit the MDD actuator dispensers and various ETD sampling media. FIG. 3 shows a CAD image of the alignment tool 100 illustrating the four cavities 110, 120, 130, and 140. The block is typically made of metal such as aluminum or stainless steel. It can be made of other suitable materials that are easy to clean and do not trap or react with any chemicals typically found in ETD samples. The alignment tool 100 may have a sufficient weight that keeps it from moving or tipping over during use.

The IONSCAN 500DT is a highly sensitive desktop trace detector used to detect and identify a wide range of military, commercial, and homemade explosives threats and common illegal/controlled narcotics. The sampling wand collects samples for analysis and prevents casual contamination as it positions and secures samples. The sampling frame assembly attaches to the arm of the sampling wand. It provides non-touch handling of the samples while securing the swab and ensuring proper heating by the desorber. The sampling frame assembly includes a sampling head and a hammer arm.

In the specific embodiment shown, the top section of the alignment tool 100 includes the first cavity 110 in the form of a circular cut-out in which the actuator dispenser may be seated. The thin, second cavity 120 is a planar cavity designed to fit the shape of a Smiths IONSCAN 500DT hand swab. The third cavity 130 is large and multipurpose to fit either the Smiths IONSCAN 500DT sampling wand or a custom insert (e.g., a 3D printed insert), which can hold sampling media for the L3 QS-B220 and Rapiscan Itemiser DX ETDs. As best seen in FIG. 2, this third cavity 130 also includes an extended cut 134 that allows any potential breakthrough of the propellant solution through the vendor media to travel and disperse instead of sticking to a surface directly below the vendor media. The fourth cavity 140 at the bottom of the alignment tool 100 is used specifically for the hammer arm of the Smiths 500DT sampling wand. By placing the hammer arm underneath this fourth cut-out or fourth cavity 140, any potential contamination from the propellant breakthrough the vendor media and onto the hammer arm is avoided or at least substantially reduced. Thus, if the sampling medium such as a sampling wand, which is placed in the sampling media cavity such as the first cavity 110 or the third cavity 130, includes a hammer arm, the hammer arm is placed in the support side cavity 140.

In the embodiment shown, the top cavity 110 is open on a top side and configured to receive a dispenser housing or a sampling medium head of a sampling medium on which to place the dispenser housing. The sampling medium head has a sample collection area. The bottom cavity 140 is configured to receive a hammer arm. One or more sampling media cavities (second cavity 120 and third cavity 130) are disposed between the top cavity 110 and the bottom cavity 140, each configured to receive another sampling medium having a respective sample collection area. The barrier 150 is disposed between the bottom cavity 140 and other cavities including the top cavity 110 and the sampling media cavities 120, 130. The top cavity 110 and the sampling media cavities 120, 130 are in communication with each other via a common slot 160 extending from the top cavity 110 to the barrier 150. The top cavity 110 and the sampling media cavities 120, 130 are configured to receive a plurality of different sampling media and to align automatically the dispenser housing with the sample collection area of each of the different sampling media to be received in the top cavity 110 or the sampling media cavities 120, 130.

As seen in FIGS. 1-3, the top cavity 110, the bottom cavity 140, and the sampling media cavities 120, 130 may be open on a side of the body which is an open side of the body. The guide channels 122, 132 may extend from the open side to the sampling media cavities 120, 130, respectively, to guide the different sampling media into the sampling media cavities 120, 130.

The alignment tool 100 can be used with several different vendor sampling media. Each vendor media may offer variations in how to operate the alignment tool 100. In embodiments, the actuator dispenser with MDD vial is seated onto the first cavity 110 at the top of the alignment tool 100 and the desired sampling media is then placed in its proper cavity. The user will ensure that each sampling media is pushed sufficiently far back into the alignment tool 100 until the "hot spot" of the sampling media is properly aligned with the propellant dispensed from the actuator dispenser. The "hot spot" is the sample collection area.

In the embodiment shown, the alignment tool 100 is a single body tool. It does not have multiple components. It may be made by machining, molding, injection molding, 3D printing, or the like. In other embodiments, the alignment tool may be assembled from multiple components. The assembled tool is configured to align a plurality of different vendor sampling media.

In specific embodiments, the alignment tool 100 is part of an ETD QC test kit that also includes at least one MDD vial or canister and an MDD actuator dispenser, as well as other items (e.g., chemical wipes, a scale, and batteries).

The alignment tool 100 can properly align the actuator dispenser and deposit material from solutions in the MDD vials onto the correct spots of the ETD vendor media in the field. The alignment tool 100 can be used to perform quality control of MDD vials in the ETD test kits and verify ETD responses. One way to deposit material is to dry-deposit the material as described, for instance, in U.S. Patent Application Publication No. 2019/0025274, entitled "DEVELOPMENT OF DRY-DEPOSIT TRACE EXPLOSIVES DETECTION TEST STANDARDS, SOLUTIONS AND METHODS FOR DEPOSITION" to Deline ("the Deline application"). The disclosure of this publication is incorporated herein by reference, including, more specifically, paragraphs [0027]-[0034] and FIGS. 2 and 3 describing dry-depositing a sample on a substrate using an actuator dispenser and a dispensing valve by depressing a canister toward the dispenser enabling the dispensing valve to actuate and dispense a corresponding measured quantity of the sample.

The Deline application discloses a system and method to dispense an explosive compound onto a substrate. An example device includes a solvent having the explosive compound dissolved in the solvent to form a sample. The sample is pressurized in a canister. A delivery mechanism is actuated to dispense the sample from the canister in a dispersed manner to sufficiently vaporize the solvent to prevent wicking while dispersing a residue of the explosive compound on the substrate to enable detection by explosive detection tools.

Figure 4:
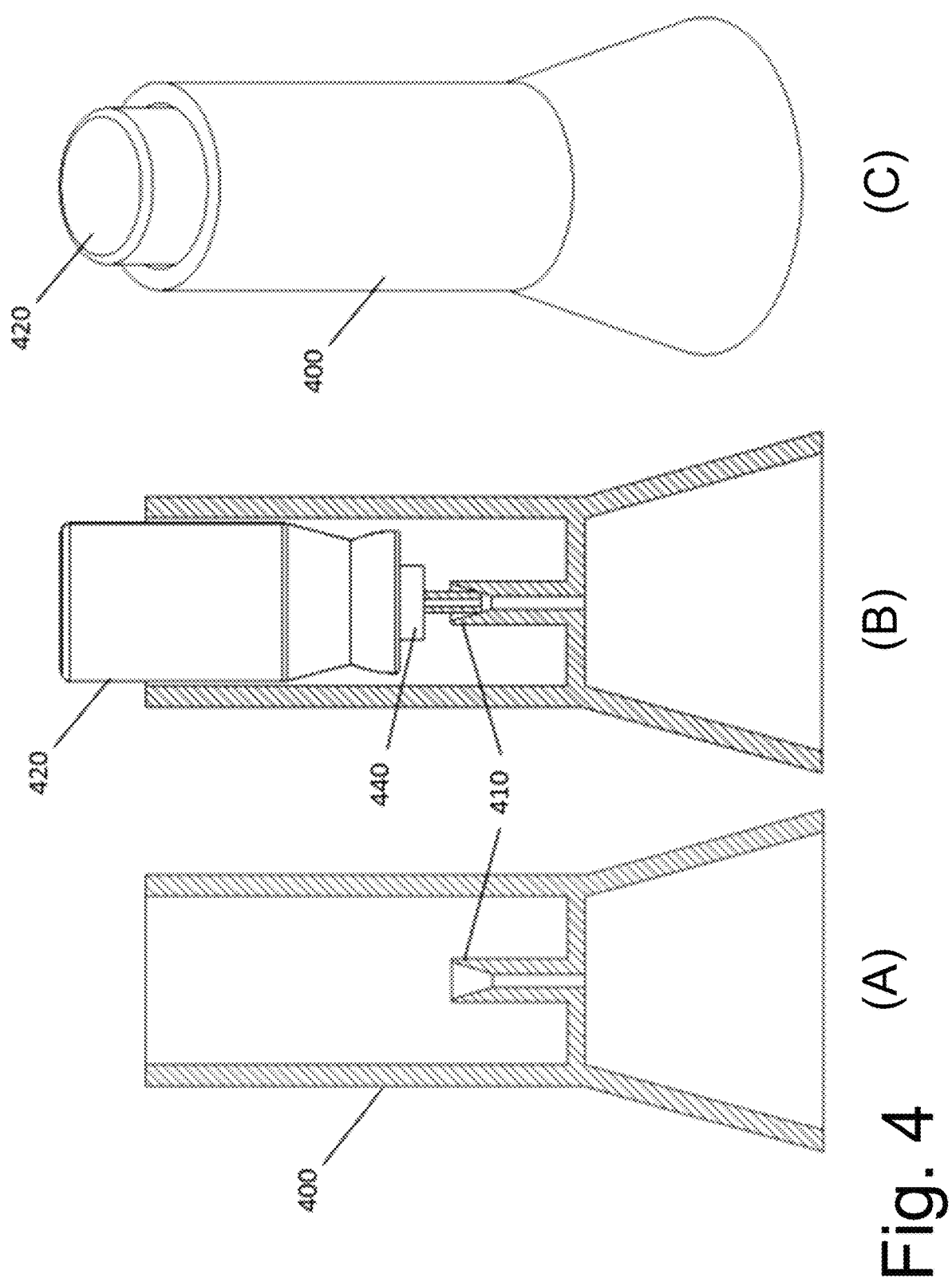

Embodiments Using Alignment Tool for Dry-Deposition of Threat Material onto Explosive Trace Detector Vendor Media I. General Procedures for Preparation of ETD QC Samples FIG. 4 shows an example of an actuator dispenser for use with the alignment tool 100, which includes (A) a cross-sectional view of the MDD actuator housing or dispenser housing 400 having an actuator 410, (B) a cross-sectional view of the dispenser housing 400 loaded with a threat MDD vial 420 for engaging the actuator 410, and (C) a perspective view of the dispenser housing 400 loaded with the MDD vial 420. The alignment tool 100 has a top cut-out or first cavity 110 for receiving and aligning the dispenser housing 400 and vial 420. The alignment tool 100 has a common slot 160 for the insertion of ETD vendor media.

In order to deposit threat material from an MDD vial 420, the user will place the MDD vial 420 upside down into the appropriate actuator 410 and press down on the MDD vial 420. This engages the actuator 410 with an actuation valve 440 of the MDD vial 420 to push and open the actuation valve 440 and allow the flow of the sample from the MDD vial 420 to the sampling medium loaded into the alignment tool 100. In an embodiment, a user may follow the general procedures described below to achieve optimal analytical results while minimizing contamination to the surroundings:

1. Wear a clean pair of nitrile gloves before handling the threat vials and swabs, and if possible, lay down a piece of paper, newspaper, etc., to prevent contamination.

2. Shake the chosen MDD vial a few times and then insert the MDD vial into its corresponding actuator dispenser (FIGS. 4(B)-(C)). In some instances, an MDD vial may have to be pushed slightly down into the actuator dispenser to be inserted properly.

3. Seat the actuator dispenser housing 400 on top of the alignment tool 100.

4. If the MDD vial has not been used that day, prime the MDD vial. If the MDD vial has been primed, skip to Step 5.
   a. Load the vendor media into the alignment tool.
   b. Actuate the MDD (in some instances press down on the vial three (3) times) onto the swab. This will prime the actuation valve to ensure proper mass loading.
   c. Dispose of this swab in the trash.

5. Load the vendor media into the alignment tool at the appropriate cavity.

6. Actuate the MDD threat vial once onto the swab.

7. Insert the swab into the ETD for analysis
   a. Samples prepared with highly volatile material samples are to be inserted as quickly as possible after deposition onto the vendor media due to the volatility of the samples.
   b. For all other threats, the solvent is allowed to flash off of the vendor media (up to 10 seconds after actuation) prior to inserting the vendor media into the ETD.

8. If the ETD alarms, perform ETD clear-down procedure (s) as dictated by the ETD vendor.

9. If the ETD does not alarm, try one of the following steps:
   a. Dispense twice onto a swab and insert the swab into the ETD for analysis.
   b. Dispense once onto a swab and insert the swab into a second ETD for analysis.
   c. Dispense twice onto a swab and insert the swab into a second ETD for analysis.
   d. Perform the Calibration/Verification procedure(s) as dictated by the vendor and repeat the analysis with the MDD vial.
   e. Use a different MDD vial to verify ETD response. Suggested MDD vials are samples with a history of high alarm rates.

10. If more samples will be prepared using the same threat material, repeat the process from Step 5.

11. If more samples will be prepared using a different threat material, repeat the process from Step 2.

12. If there are issues with cross-contamination of an actuator dispenser, the MDD vial labeled as "solvent" could be dispensed through the actuator dispenser to "flush" the tube.

13. After analysis is complete for the day, wipe down the alignment tool with an appropriate solvent (e.g., isopropyl alcohol).

14. Dispose of all used swabs and gloves in the trash.

II. Example Preparation of Samples for the Smiths 500DT with Sampling Wand Media A. Preparation of Samples for Materials with Mid to Low Volatilities or Non-Volatiles FIG. 5 shows an example illustrating the use of the alignment tool 100 with the Smiths 500DT sampling wand 510, including (A) an alignment tool 100, MDD vial 420, representative actuator dispenser housing 400, the Smiths 500DT sampling wand 510, and the Smiths sampling wand hammer arm 520, (B) after loading a swab 512 into the ETD sampling wand 510 and lining it up with the alignment tool 100, pushing the sampling wand 510 into the larger slot (third cavity 130) of the tool with the hammer arm 520 (inserted into the fourth cavity 140), and (C) inserting the sampling wand 510 fully and then actuating the MDD vial 420.

Figure 5:
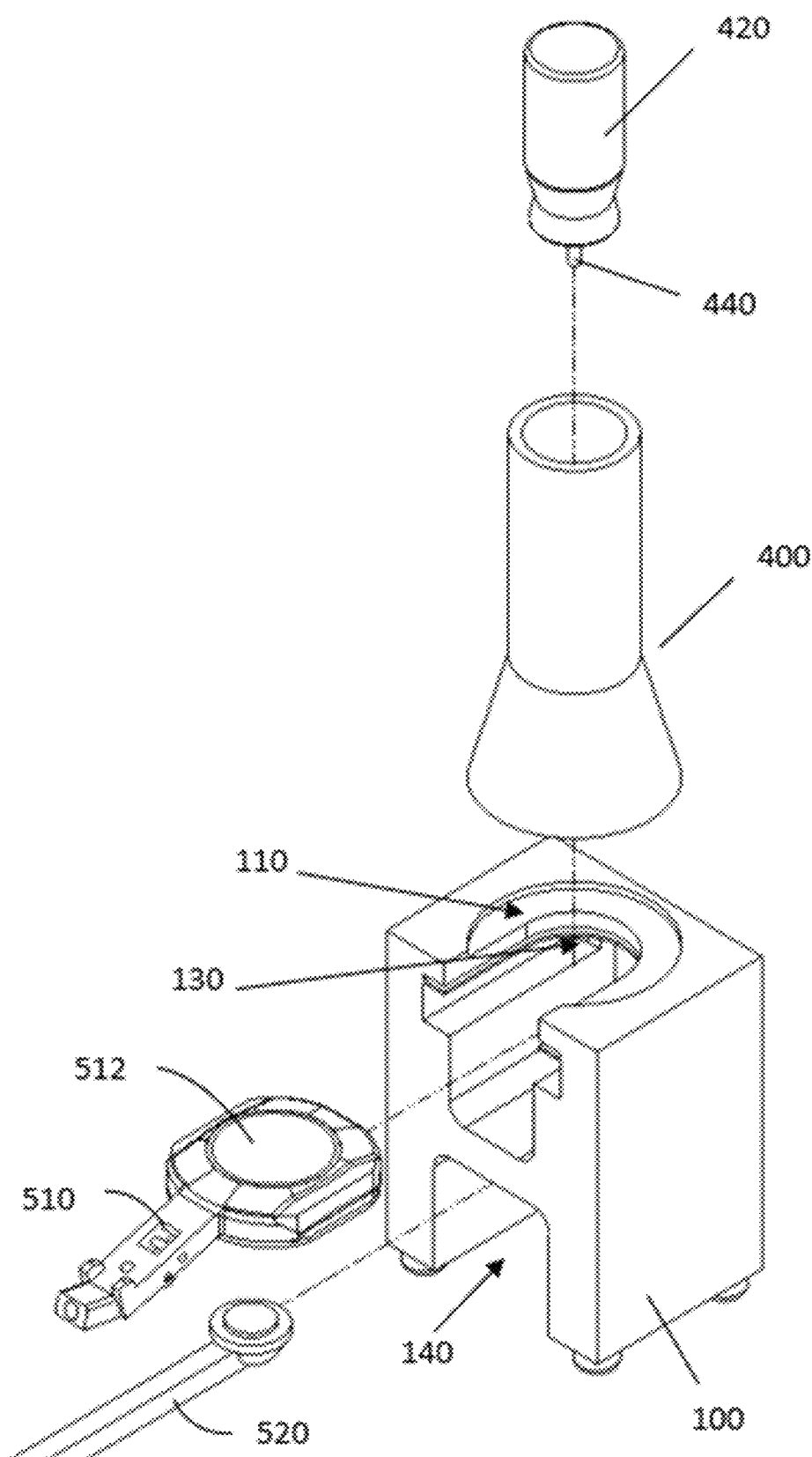
Figure 5:
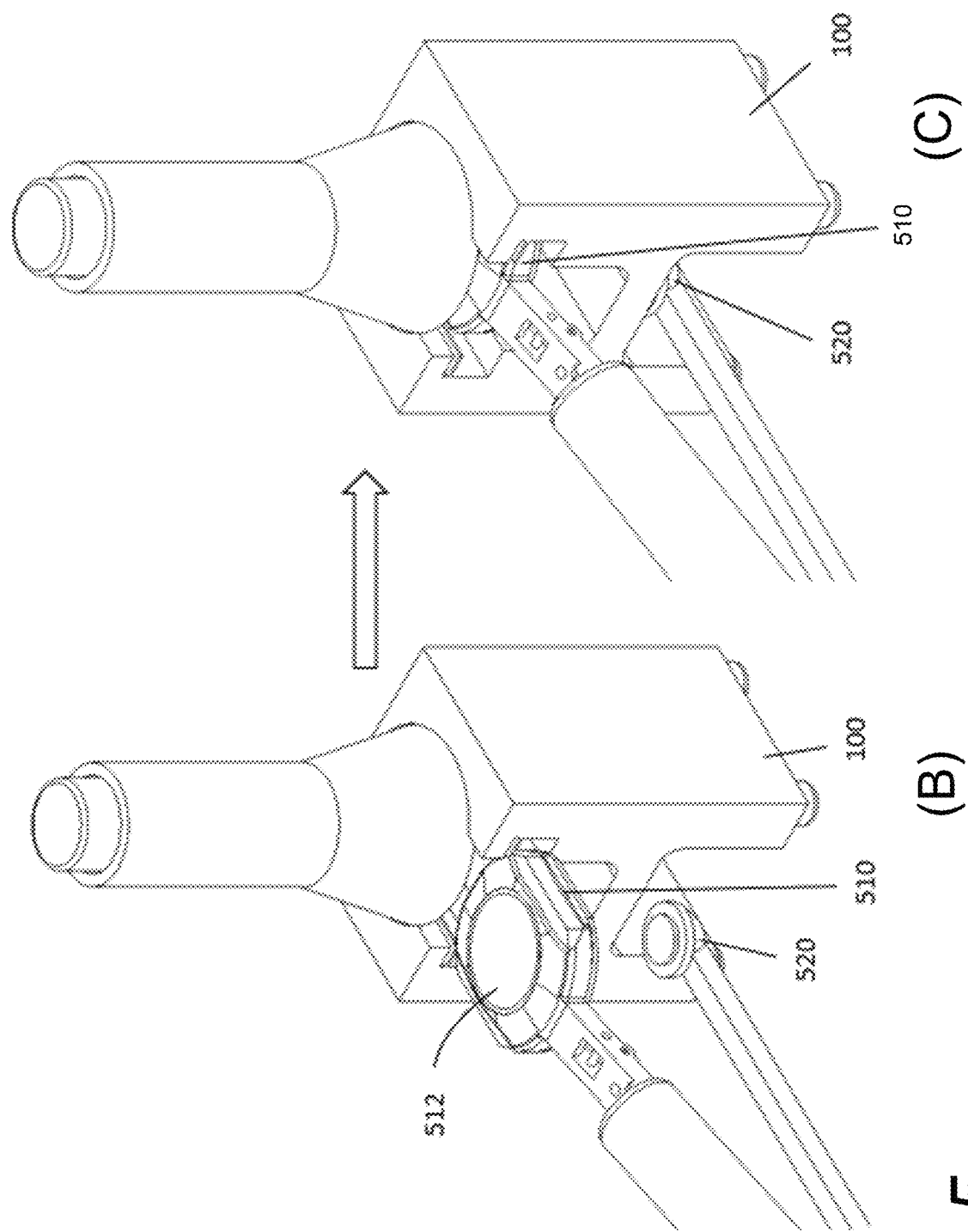

Embodiments using a sampling wand for the Smiths 500DT ETD, shown in FIG. 5, are as follows:

1. Follow Steps 1-4 from the General Procedures (Section I).

2. Load the sampling swab 512 into the sampling wand 510 per Smiths' procedures.

3. Hold down the trigger to move the hammer arm 520 away from the sampling media.

4. Insert the sampling wand 510 into the larger slot (third cavity 130) of the alignment tool 100 with the hammer arm 520 underneath (fourth cavity 140) the alignment tool "shelf" or barrier 150 (FIGS. 5(B) and 5(C)).

a. If the alignment tool 100 is to be used at the table edge, the hammer arm 520 will be kept perpendicular to the table edge while keeping the sampling wand trigger depressed.

5. Follow Steps 6-14 from the General Procedures (Section I), with some highlighted specifics:

a. The sampling wand 510 will be held while in the alignment tool 100 or else the tool may tip over.

b. Use one hand to hold the sampling wand 510 and the other hand to actuate the MDD vial 420.

c. After actuating the MDD vial 420, remove the sampling wand 510 from alignment tool 100 while keeping the sampling wand trigger depressed. This is intended to prevent the hammer arm 520 from being contaminated and allow for easy insertion of the wand head into the ETD.

Figure 6:
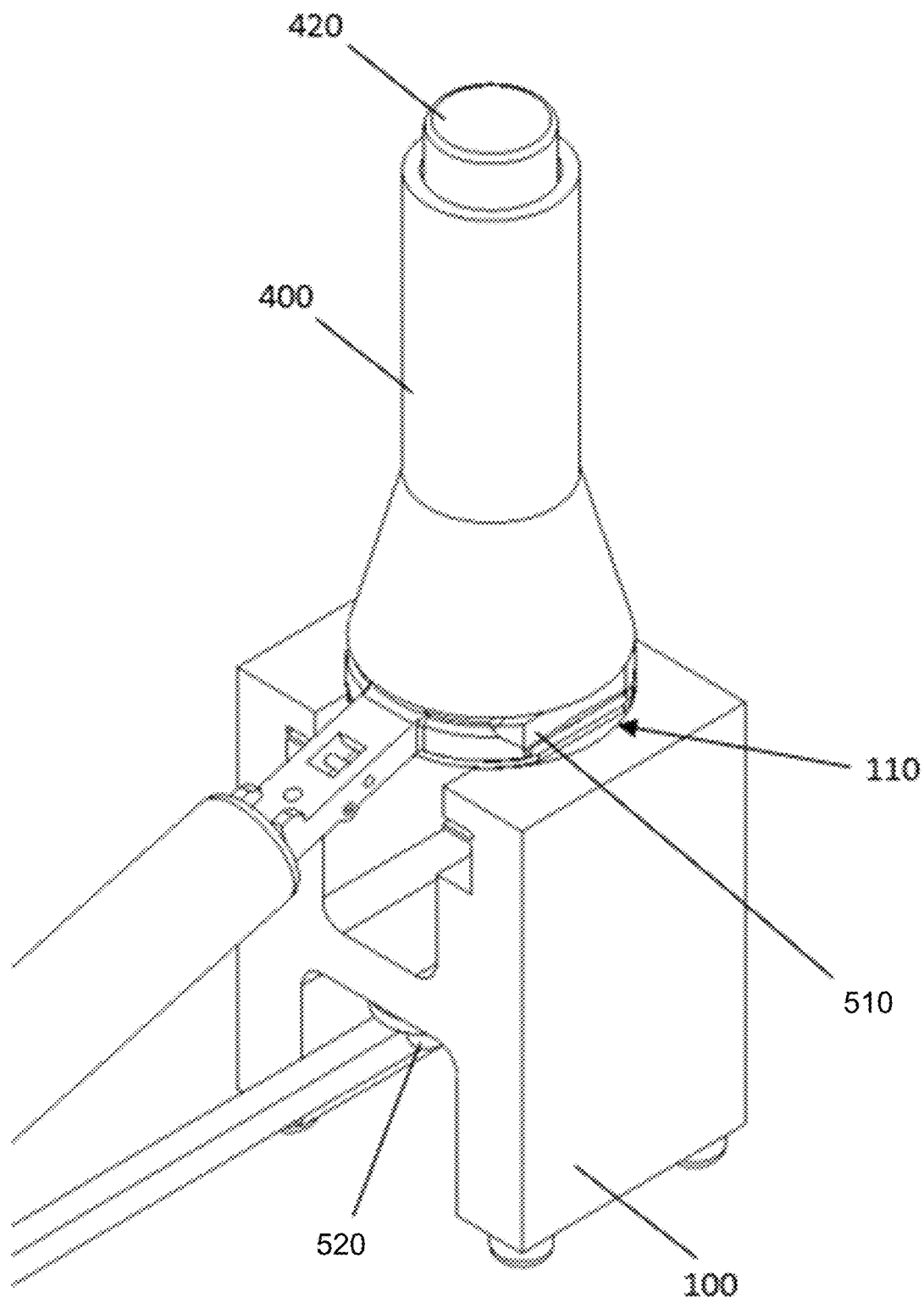

B. Preparation of Smiths 500DT Sample Wand Samples for Highly Volatile Material Samples FIG. 6 shows an example illustrating preparation of highly volatile material samples using the Smiths 500DT sampling wand 510. The dispenser housing 400 with MDD vial 420 is placed directly on top of the Smiths 500DT sampling wand 510, which is placed on top of the alignment tool 100 at the first cavity 110 for stability. It is recommended to prepare these samples as close as possible to the interface of the ETD. As such, the dispenser side cavity 110 is configured to receive the sampling medium head of the sampling medium 510 on which to place the dispenser housing 400. The sampling medium head has a sample collection area to be aligned with the dispenser housing 400.

1. Follow Steps 1-2 from the General Procedures (Section I).

2. Prime the MDD vial 420, if not previously used, according to Step 4 from the General Procedures.

3. Load the sampling swab into the sampling wand 510 per Smiths' procedures.

4. Hold down the trigger to move the hammer arm 520 away from the sampling media.

5. Place the actuator dispenser with MDD vial 420 directly on top of the sampling wand 510. The dispenser housing 400 will be centered on top of the sampling wand 510. See FIG. 6.

a. The alignment tool 100 could be used for added stability. In this case, the sampling wand 510 is placed on top of the alignment tool 100 at the first cavity 110, and the dispenser housing 400 is placed on top of the sampling wand 510. See FIG. 6.

6. Follow Steps 6-14 from the General Procedures (Section I), with some highlighted specifics:

a. It is recommended to prepare these samples as close as possible to the interface of the ETD.

b. Use one hand to hold the sampling wand 510 while keeping the trigger depressed and the other hand to actuate the MDD vial 420.

c. After actuating the MDD vial 420, insert the sampling wand 510 into the ETD as quickly as possible.

III. Preparation of Samples for the Smiths 500DT with Hand Swabs

Figure 7:
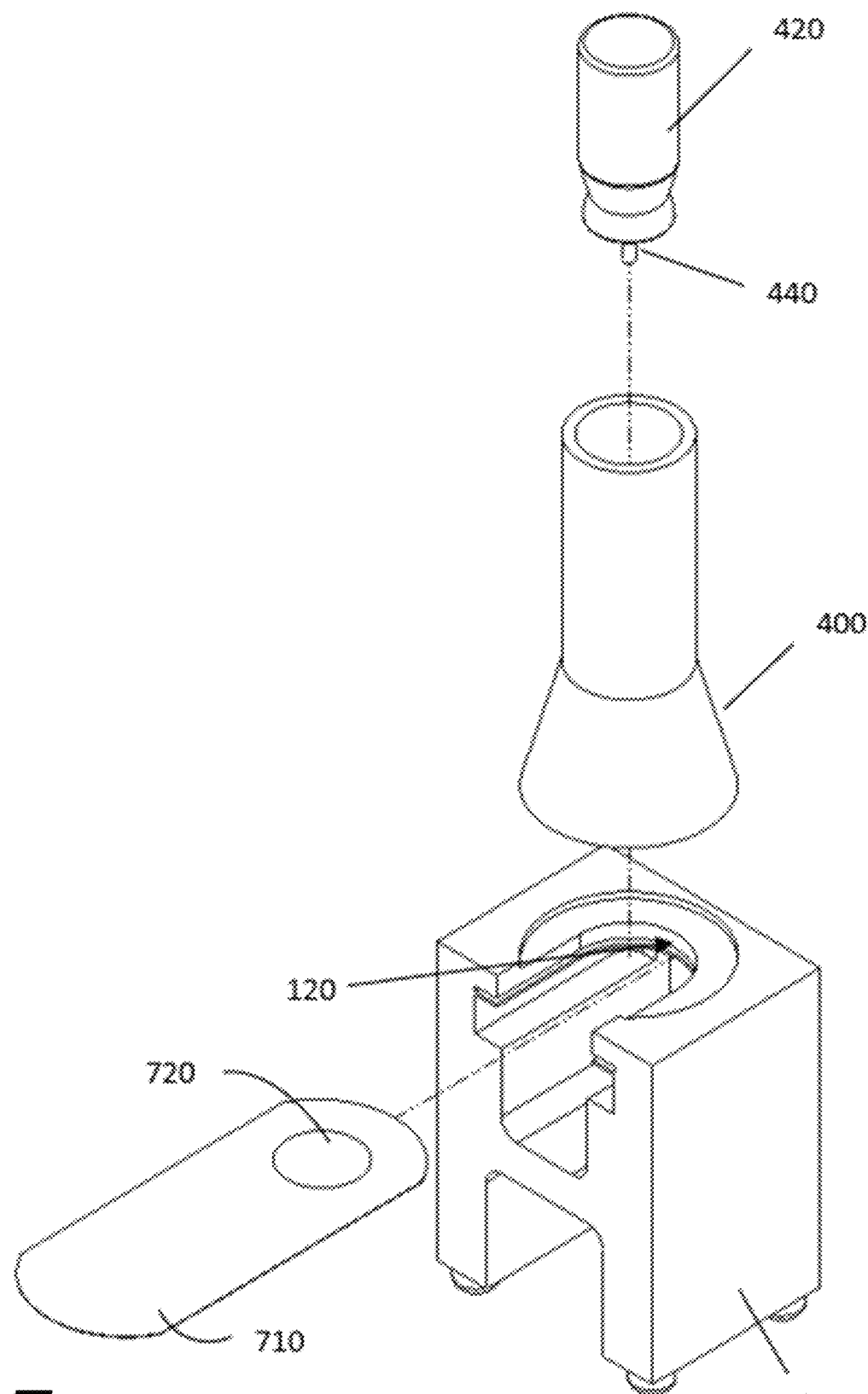

FIG. 7 shows an example illustrating the use of the alignment tool 100 for Smiths 500DT hand swabs, including an exploded view of the assembly including the alignment tool 100, NIDD vial 420, dispenser housing 400, and Smiths 500DT hand swab 710. The hand swab 710 is inserted into the alignment tool 100 and the sample collection area 720 is aligned for preparation of samples for the Smiths 500DT hand swab 710. The hand swab 710 is placed in the upper small slot (second cavity 120) of the alignment tool 100. Detailed procedures to prepare samples using the hand swabs for the Smiths 500DT ETD are as follows:

1. Follow Steps 1-4 from the General Procedures (Section I).

2. Remove a hand swab 710 from its container and ensure that the embossed side is facing up.

3. Load the hand swab 710 into the upper smaller slot (second cavity 120) of the alignment tool 100.

4. Follow Steps 6-14 from the General Procedures (Section I), with some highlighted specifics:

a. Care is to be taken to insert and remove the hand swab 710 into and from the alignment tool 100 and ETD.

b. After inserting the hand swab 710 into the ETD, press the "Analyze" button on the ETD.

c. For highly volatile material samples, the alignment tool 100 will be placed as close to the ETD interface as possible. After actuating the NIDD vial 420, insert the sampling medium (hand swab) 710 into the ETD as quickly as possible.

Figure 8:
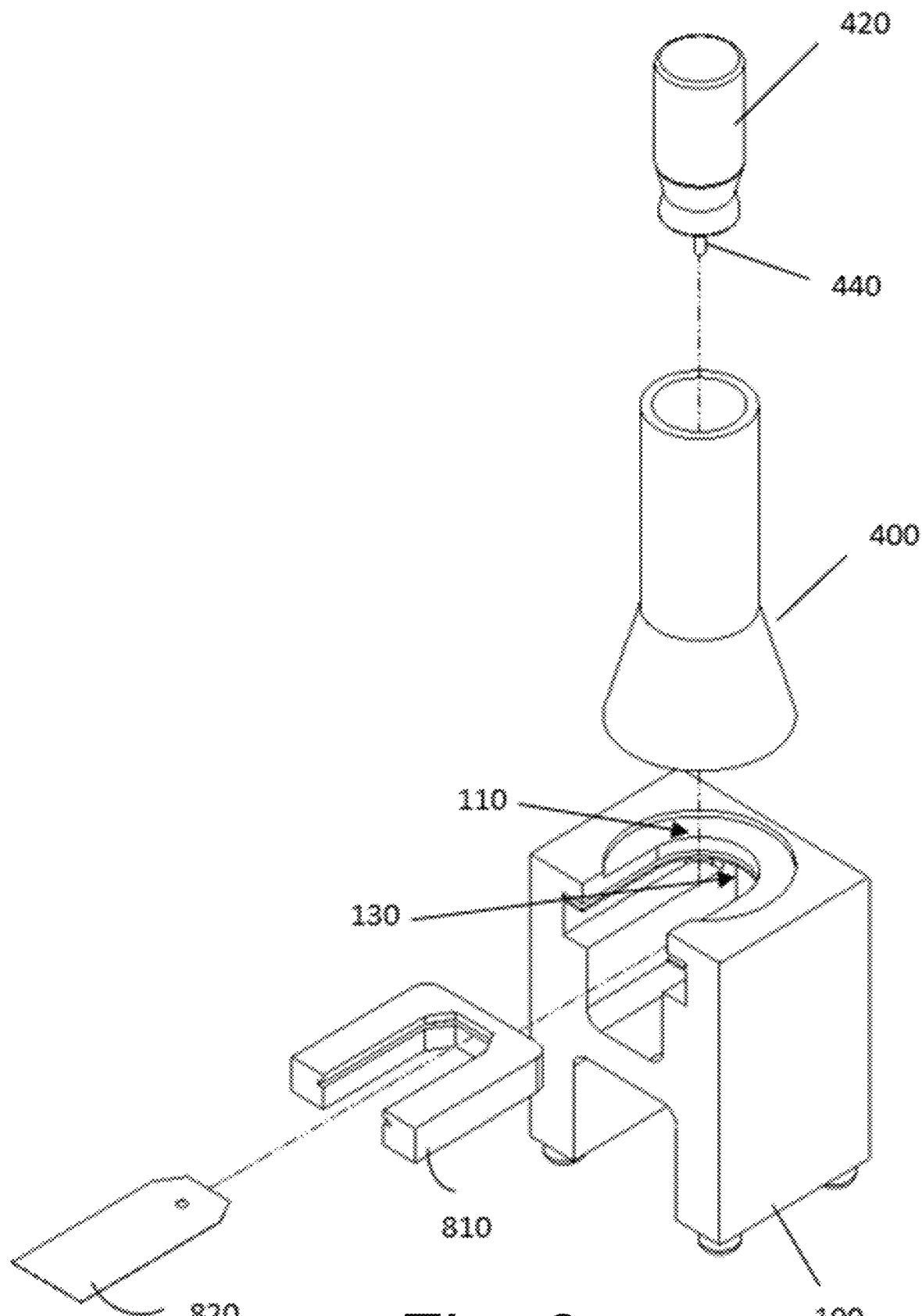

IV. Embodiments of Preparing Samples for the L3 QS-B200 and Rapiscan Itemiser DX ETDs FIG. 8 shows an example illustrating the use of the alignment tool 100 for L3 QS-B220 sampling swabs, including an exploded view of the assembly including the alignment tool 100, insert 810, MDD vial 420, dispenser housing 400, and L3 QS-B220 sampling media 820. The insert 810 is used for L3 QS-B220 and Rapiscan Itemizer DX vendor media 820. The 3D printed insert 810 is placed into the larger slot (third cavity 130) of the alignment tool 100. The L3 sampling media or vendor media 820 is inserted and aligned to prepare a sample. As such, the insert 810 fits in one of the sampling media cavities (third cavity 130) and an inserted sampling medium 820 is received into an insert cavity of the insert 810 for alignment by the body of the alignment tool 100.

Procedures of embodiments for using sample traps for either the Rapiscan Itemiser DX or L3 QS-B220 ETDs are as follows:

1. Follow Steps 1-4 from the General Procedures (Section I).

2. The 3D printed insert 810 is placed into the larger slot (third cavity 130) of the alignment tool 100. The insert 810 will be placed as far into the alignment tool 100 as possible.

3. Remove a sampling swab 820 from its container and place the swab 820 into the 3D printed insert 810. The swab 820 will be pushed into the 3D printed insert 810 as far as possible.

4. Follow Steps 6-14 from the General Procedures (Section I), with some highlighted specifics:

a. Care is to be taken to place and remove the 3D printed insert 810 and sampling swabs 820 into and from the alignment tool 100.

b. If the insert 810 becomes contaminated, try to clean with an appropriate solvent (e.g., isopropyl alcohol). If contamination continues to be an issue, the insert 810 may be replaced.

c. For highly volatile material samples, the alignment tool 100 is to be placed as close to the ETD interface as possible. After actuating the MDD vial 420, insert the sampling media (swab) 820 into the ETD as quickly as possible.

5. To remove the insert 810 from the alignment tool 100, it is recommended to push the insert 810 from the back of the alignment tool 100 so that it sticks out, and then pull it from the front and remove.

As described above, examples of different sampling media include a hand swab (e.g., hand swab 710 which can be received in the second cavity 120), a sampling wand (e.g., sampling wand 510 to be received in the third cavity 130), a sampling wand having a hammer arm to be received into the bottom cavity 140 (e.g., sampling wand 510 to be received in the third cavity 130 with hammer arm 520 to be received into the bottom cavity 140 or sampling wand 510 to be received in the first cavity 110 with hammer arm 520 to be received into the bottom cavity 140), and a combination of an insert 810 which fits into one of the sampling media cavities (third cavity 130) and the inserted sampling medium 820 which is received into an insert cavity of the insert 810 for alignment by the body of the alignment tool 100. The third cavity 130 may be a versatile sampling media cavity configured to receive the sampling wand 510 or the combination of the insert 810 and the inserted sampling medium 820 which is received into the insert cavity of the insert 810.

A sampling medium is placed in one of (i) a sampling media cavity of the sampling media cavities (120, 130), the dispenser side cavity 110 and the sampling media cavity (120, 130) aligning the dispenser housing 400 with the sample collection area of the sampling medium (510, 710, 820) placed in the sampling media cavity, or (ii) the dispenser side cavity 110 between the body and the dispenser housing 400, the sampling medium 510 having a sample collection area and aligning the dispenser housing 400 with the sample collection area of the sampling medium 510. After a sampling medium (510, 710, 820) is placed in the dispenser side cavity 110 or one of the sampling media cavities (120, 130), the dispenser is actuated to dispense a sample from the dispenser housing 400 onto the sample collection area of the sampling medium (510, 710, 820) placed in the sampling media cavity (120, 130) or the dispenser side cavity (110), which is aligned with the dispenser housing 400.

The inventive concepts taught by way of the examples discussed above are amenable to modification, rearrangement, and embodiment in several ways. For example, the body of the alignment tool may have a different shape or a different construction and may have different cavities, a different number of cavities, or a different arrangement of cavities in order to form an alignment tool within the analytical detector. In addition, inserts can be manufactured out of different materials and be designed to receive vendor sampling media not noted above. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A kit-of-parts for assembling an apparatus for verifying Explosive Trace Detector (ETD) responses, the kit-of-parts comprising an alignment tool and a dispenser having a dispenser housing and an actuator, the alignment tool including:
   a body having a top cavity which is open on a top side and configured to receive the dispenser housing or a sampling medium head of a sampling medium on which to place the dispenser housing, the sampling medium head having a sample collection area;
   a bottom cavity configured to receive a hammer arm; and
   one or more sampling media cavities disposed between the top cavity and the bottom cavity, each configured to receive another sampling medium having a respective sample collection area;
   the top cavity and the one or more sampling media cavities in communication with each other via a common slot extending to the top cavity; and
   the top cavity and the one or more sampling media cavities being configured to receive a plurality of different sampling media and to align the dispenser housing with the sample collection area of each of the different sampling media to be received in the top cavity or the one or more sampling media cavities.

2. The kit-of-parts of claim 1, further comprising:
   a barrier disposed between the bottom cavity and other cavities including the top cavity and the one or more sampling media cavities;
   wherein the top cavity and the one or more sampling media cavities are in communication with each other via the common slot extending from the top cavity to the barrier.

3. The kit-of-parts of claim 1,
   wherein the bottom cavity and the one or more sampling media cavities are open on a side of the body which is an open side of the body.

4. The kit-of-parts of claim 3, wherein the alignment tool further comprises:
   guide channels extending from the open side to the one or more sampling media cavities to guide the different sampling media in the one or more sampling media cavities.

5. The kit-of-parts of claim 1, wherein the alignment tool further comprises:
guide channels configured to guide the different sampling media in the one or more sampling media cavities.

6. The kit-of-parts of claim 1, further comprising the plurality of different sampling media which include two or more of:
a hand swab;
a sampling wand;
a sampling wand having a hammer arm to be received into the bottom cavity; and
a combination of an insert which fits in one of the one or more sampling media cavities and an inserted sampling medium which is received into an insert cavity of the insert for alignment by the body of the alignment tool.

7. The kit-of-parts of claim 6,
wherein at least one sampling media cavity of the one or more sampling media cavities is a versatile sampling media cavity configured to receive the sampling wand or the combination of the insert and the inserted sampling medium which is received into the insert cavity of the insert.

8. The kit-of-parts of claim 6,
wherein the inserted sampling medium which is received into the insert cavity of the insert comprises another hand swab.

9. The kit-of-parts of claim 1, further comprising:
a vial configured to be inserted into the dispenser housing to be coupled with the actuator;
wherein the vial includes a dispensing valve which is actuated by pressing on the vial to actuate the dispensing valve with the actuator to dispense a measured quantity of a sample onto the sample collection area.

10. The kit-of-parts of claim 1, further comprising:
a scale, a battery, and a chemical wipe.

11. An alignment tool comprising a body having:
a dispenser side cavity which is open on a dispenser side and configured to receive a dispenser housing of a dispenser;
a support side cavity configured to receive a hammer arm; and
a plurality of sampling media cavities disposed between the dispenser side cavity and the support side cavity, each configured to receive a sampling medium having a respective sample collection area; and
the dispenser side cavity and the sampling media cavities in communication with each other via a common slot extending to the dispenser side cavity; and
the dispenser side cavity and the sampling media cavities being configured to receive a plurality of different sampling media and to align the dispenser housing with the respective sample collection area of each of the different sampling media to be received in the dispenser side cavity or the sampling media cavities.

12. The alignment tool of claim 11, further comprising:
a barrier disposed between the support side cavity and other cavities including the dispenser side cavity and the sampling media cavities;
wherein the dispenser side cavity and the sampling media cavities are in communication with each other via the common slot extending from the dispenser side cavity to the barrier.

13. The alignment tool of claim 11,
wherein the dispenser side cavity is configured to receive a sampling medium head of a sampling medium on which to place the dispenser housing, the sampling medium head having a sample collection area.

14. The alignment tool of claim 11,
wherein the support side cavity and the sampling media cavities are open on a side of the body which is an open side of the body.

15. The alignment tool of claim 14, further comprising:
guide channels extending from the open side to the sampling media cavities to guide the different sampling media in the sampling media cavities.

16. The alignment tool of claim 11,
wherein the plurality of different sampling media include two or more of a hand swab, a sampling wand, a sampling wand having a hammer arm to be received into the support side cavity, and a combination of an insert which fits in one of the sampling media cavities and an inserted sampling medium which is received into an insert cavity of the insert for alignment by the body of the alignment tool.

17. The alignment tool of claim 16,
wherein at least one sampling media cavity of the sampling media cavities is a versatile sampling media cavity configured to receive the sampling wand or the combination of the insert and the inserted sampling medium which is received into the insert cavity of the insert.

18. A method of aligning a dispenser housing with sample collection areas of a plurality of different sampling media using an alignment tool, which includes a body having a dispenser side cavity which is open on a dispenser side, a support side cavity, and a plurality of sampling media cavities disposed between the dispenser side cavity and the support side cavity, the dispenser side cavity and the sampling media cavities in communication with each other via a common slot extending to the dispenser side cavity, the method comprising:
placing a dispenser housing of a dispenser on the dispenser side cavity;
placing a sampling medium in one of (i) a sampling media cavity of the sampling media cavities, the dispenser side cavity and the sampling media cavity aligning the dispenser housing with a sample collection area of the sampling medium placed in the sampling media cavity, or (ii) the dispenser side cavity between the body and the dispenser housing, the sampling medium configured to align the dispenser housing with the sample collection area of the sampling medium; and
if the sampling medium being placed includes a hammer arm, placing the hammer arm in the support side cavity;
the dispenser side cavity and the sampling media cavities being configured to receive the plurality of different sampling media and to align the dispenser housing with the sample collection area of each of the different sampling media to be received in the sampling media cavities.

19. The method of claim 18, further comprising:
blocking communication between the support side cavity and the other cavities including the dispenser side cavity and the plurality of sampling media cavities, wherein the dispenser side cavity and the sampling media cavities are in communication with each other via the common slot extending to the dispenser side cavity.

20. The method of claim 18,
wherein the support side cavity and the sampling media cavities are open on a side of the body which is an open side of the body; and
wherein the different sampling media are placed in the sampling media cavities from the open side of the body.

21. The method of claim 20,
wherein the body includes guide channels extending from the open side to the sampling media cavities to guide the different sampling media into the sampling media cavities; and
wherein the different sampling media are placed in the sampling media cavities from the open side of the body via the guide channels.

22. The method of claim 18,
wherein the body includes guide channels to guide the different sampling media into the sampling media cavities; and
wherein the different sampling media are placed in the sampling media cavities via the guide channels.

23. The method of claim 18, wherein the plurality of different sampling media include two or more of:
a hand swab;
a sampling wand;
a sampling wand having a hammer arm to be received into the support side cavity, and
a combination of an insert which fits in one of the sampling media cavities and an inserted sampling medium which is received into an insert cavity of the insert for alignment by the body of the alignment tool.

24. The method of claim 23,
wherein at least one sampling media cavity of the sampling media cavities is a versatile sampling media cavity configured to receive the sampling wand or the combination of the insert and the inserted sampling medium which is received into the insert cavity of the insert; and
wherein placing the sampling medium in one of the sampling media cavities comprises placing, in the versatile sampling media cavity, the sampling wand or the combination of the insert and the inserted sampling medium which is received into the insert cavity of the insert.

25. The method of claim 18, further comprising:
actuating the dispenser to dispense a sample from the dispenser housing onto the sample collection area of the sampling medium placed in the sampling media cavity or the dispenser side cavity, which is aligned with the dispenser housing.

26. The method of claim 25, wherein actuating the dispenser comprises:
inserting a vial into the dispenser housing to be coupled with the actuator; and
pressing on the vial to actuating a dispensing valve of the vial with the actuator to dispense a measured quantity of a sample onto the sample collection area.

* * * * *